Feb. 1, 1949.  W. N. WHEELER  2,460,479
CHILD'S VEHICLE
Filed June 25, 1946  3 Sheets-Sheet 1
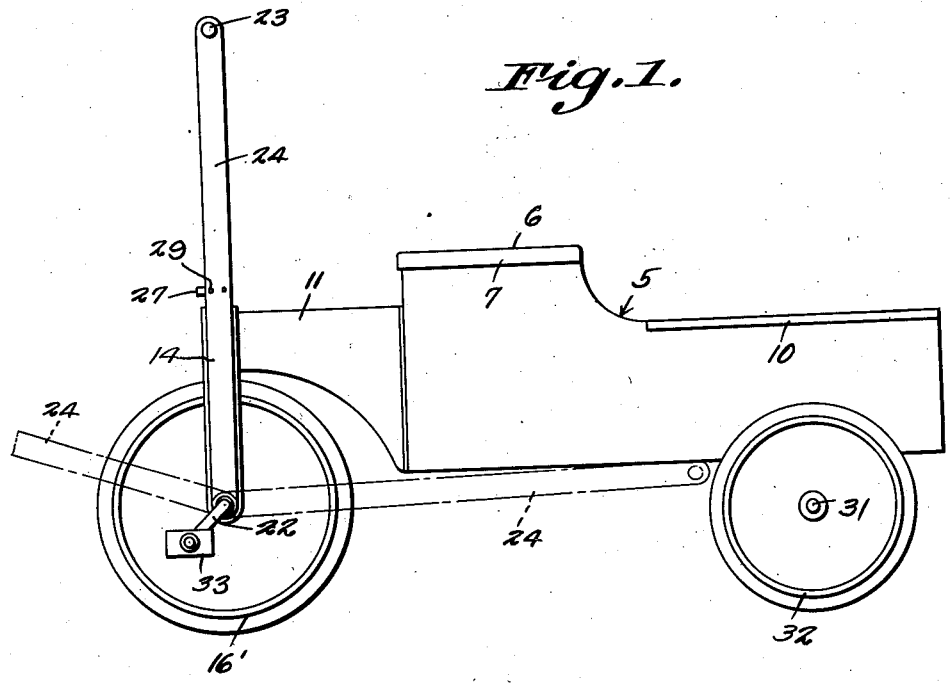
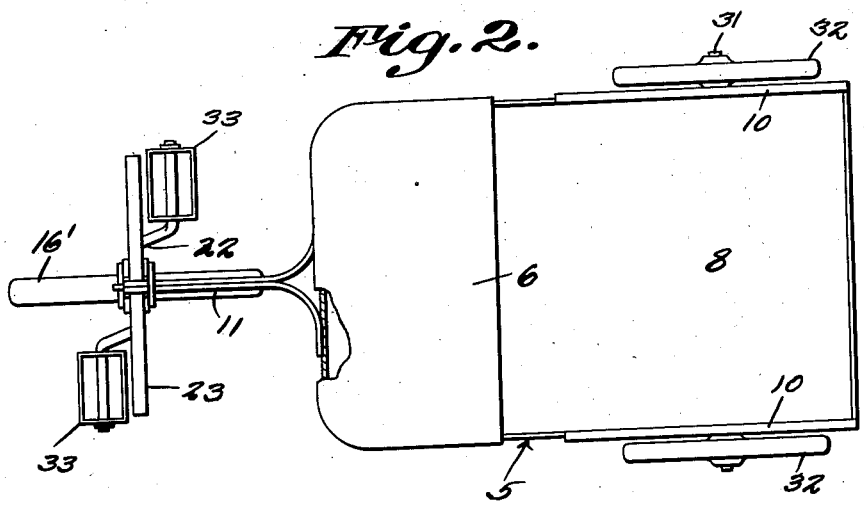
W. N. Wheeler
INVENTOR.
BY C. A. Snow & Co.
ATTORNEYS.

Feb. 1, 1949.  W. N. WHEELER  2,460,479
CHILD'S VEHICLE
Filed June 25, 1946  3 Sheets-Sheet 2
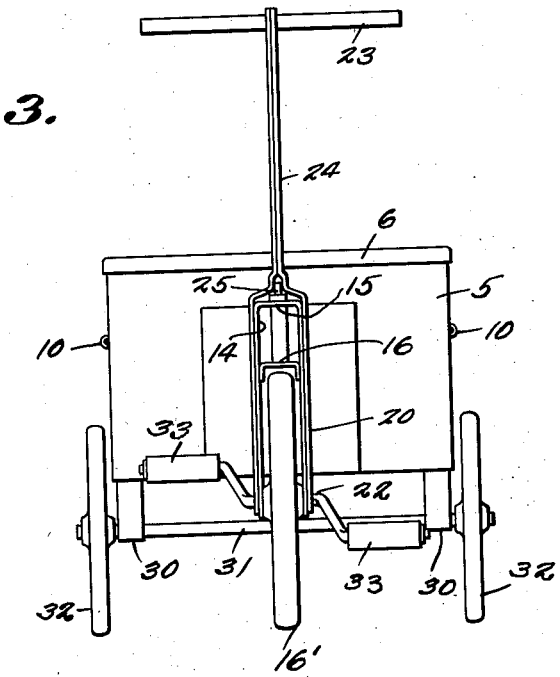
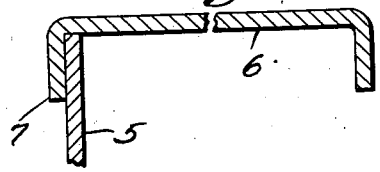
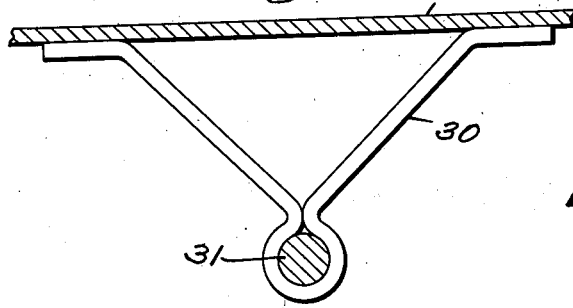
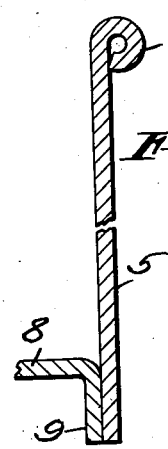
W. N. Wheeler
INVENTOR.
BY
ATTORNEYS.

Feb. 1, 1949.  W. N. WHEELER  2,460,479
CHILD'S VEHICLE
Filed June 25, 1946  3 Sheets-Sheet 3

W. N. Wheeler
INVENTOR.
BY *[signature]*
ATTORNEYS.

Patented Feb. 1, 1949

2,460,479

UNITED STATES PATENT OFFICE 2,460,479

CHILD'S VEHICLE

William N. Wheeler, Paris, Ky.

Application June 25, 1946, Serial No. 679,162

2 Claims. (Cl. 280—7.17)

This invention relates to vehicles designed for children, the primary object of the invention being to provide a vehicle of this character embodying the combined features of a hauling bed and propelling means.

An important object of the invention is to provide a pivoted handle for the vehicle, the handle being so constructed that it may be swung upwardly to a vertical position, where it may be employed as the handle bar or guiding mechanism of the vehicle, or swung downwardly to a horizontal position where it may be used as a means for pulling the vehicle when using the vehicle as a wagon.

Another object of the invention is to provide a vehicle wherein the handle may be swung to a position directly under the body of the vehicle so that it will be out of the way to permit the vehicle to be shipped and stored with facility.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a side elevational view of a child's vehicle, constructed in accordance with the invention.

Figure 2 is a plan view thereof.

Figure 3 is a front elevational view of the vehicle, illustrating the handle as elevated for use as handle bars.

Figure 8 is a fragmental sectional view through the seat and front wall of the body of the vehicle.

Figure 9 is a fragmental sectional view illustrating the manner of supporting the rear axle of the vehicle.

Figure 10 is a fragmental sectional view illustrating the manner of securing the bottom of the vehicle to the body of the vehicle.

Figure 4:
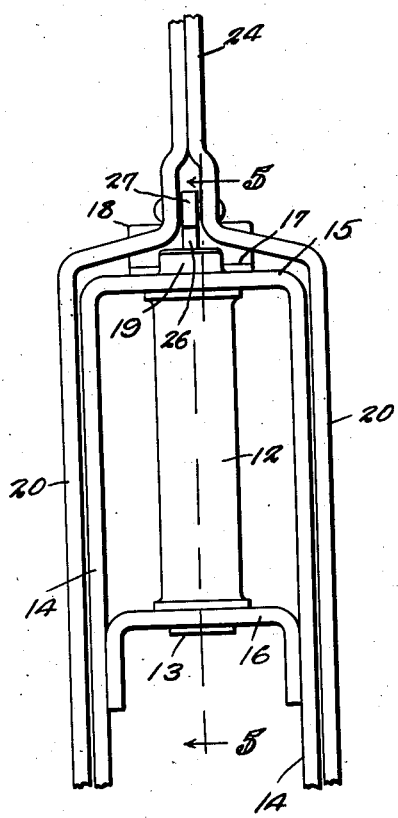
Figure 4 is an enlarged detail view illustrating the front forks of the vehicle together with portions of the handle of the vehicle.
Figure 6:
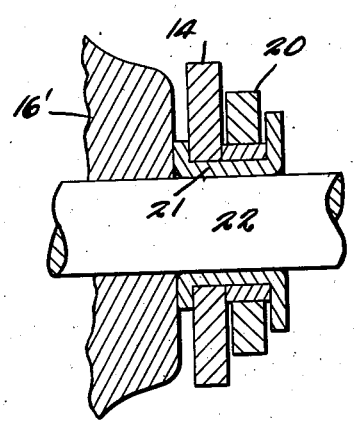
Figure 6 is a fragmental sectional view through the bearing and front axle of the vehicle.
Figure 5:
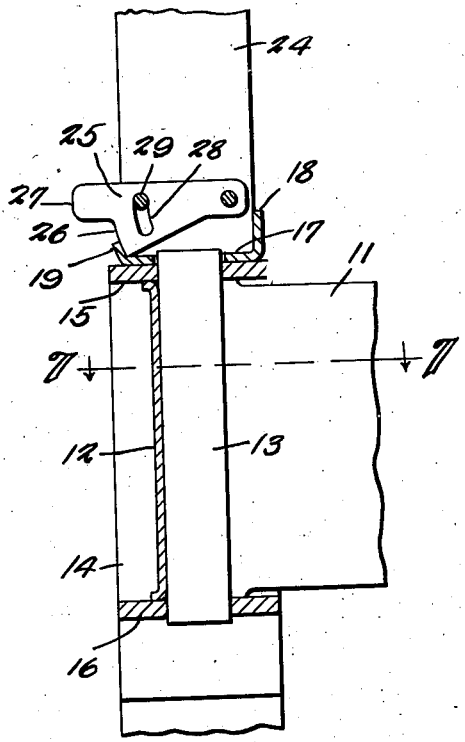
Figure 5 is a longitudinal sectional view taken on line 5—5, Fig. 4.
Figure 7:
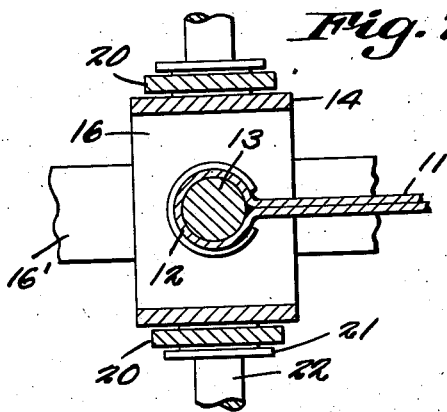
Figure 7 is a transverse sectional view taken on line 7—7 of Fig. 5.

Referring to the drawings in detail, the body of the vehicle is indicated generally by the reference character 5, the body being preferably constructed of sheet metal material and of a design to provide a seat portion 6, the seat portion 6 being formed with a downwardly extended flange 7 that fits over the upper edge of the body, as clearly shown by Fig. 8 of the drawings.

The bottom of the body is indicated by the reference character 8, and is provided with a flange 9 that fits against the inner surface of the side of the body 5, the upper edge of the side of the body 5 being curved outwardly providing a curved upper edge 10.

Extending forwardly from the front end of the body 5, are arms 11 which are formed with a tubular section 12 disposed vertically, through which the pivot pin 13 extends, the connection between the pivot pin and tubular section 12, being such that the forks 14 between which the front wheel 16' is mounted, may swing with the pivot pin 13 in guiding the vehicle.

The upper and lower ends of the pivot pin 13, extend into openings formed in the bar 15 of the front fork 14, and the bar 16, which connects the arms of the forks directly below the bar 15.

Secured to the upper surface of the bar 15, is a locking plate 17 that has a rear upwardly extended flange 18 and a forwardly inclined lip 19.

The handle of the vehicle embodies forks 20 that are formed with openings to accommodate the sleeve bearings 21 in which the front axle 22 of the vehicle operates. The forks 20 include the handle bars 23 that are mounted in openings formed at the free ends of the arms 24 that form the wagon or vehicle tongue.

As shown by Fig. 4 of the drawings, the arms 24 are offset providing a space for the latch 25, that is pivotally connected between the arms. The latch member 25 is formed with a shoulder 26 that is adapted to move into engagement with the inner surface of the lip 19 when the arms 24 are swung upwardly to the vertical position as shown by Fig. 1 of the drawings, thereby securing the arms 24 in their upright position whereby the device may be used as a self-propelled vehicle or velocipede.

The latch member 25 is formed with a finger piece 27 whereby the latch may be raised to disengage the lip, releasing the arms 24 to be swung forwardly to the dotted line position as shown by Fig. 1 of the drawings, or to a position completely under the body of the vehicle, as shown by dotted lines in Fig. 1.

The latch member is formed with an elongated opening 28 that accommodates the pin 29 which connects the arms 24, the opening and pin providing a guide to strengthen the latch member so that it will better withstand the strain to which it is subjected in turning the vehicle when guiding the vehicle.

The reference character 30 indicates bearings in which the rear axle 31 is mounted, the rear axle 31 providing the support for the wheels 32 at the rear of the vehicle.

It might be further stated that the axle 22 is formed with extensions on which the pedals 32 are mounted so that the front wheel constitutes the propelling wheel of the vehicle when it is desired to use the vehicle as a velocipede.

From the foregoing it will be seen that due to the construction shown and described, the handle may be either swung from the vertical position to a horizontal position to afford means whereby the vehicle may be pulled, or the arms may be swung upwardly so that the device may be used in steering the vehicle by the child seated on the seat and operating the pedals.

What is claimed is:

1. A vehicle of the type described, comprising a body, front and rear supporting wheels for the body, a fork in which the front wheel is mounted, a plate secured to the fork, a rear flange formed on the plate, a lip extending upwardly and forwardly from the front edge of the plate, a pivoted tongue including a fork fitted over the first mentioned fork, said tongue adapted to swing from a horizontal position to a vertical position, a pivoted latch member carried by the fork of the tongue and adapted to move to a position in contact with the lip securing the tongue in its vertical position, and handle bars carried by the tongue whereby the tongue may be operated to guide the vehicle.

2. A vehicle of the type described, comprising a body, front and rear supporting wheels for the body, a fork in which the front wheel is mounted, a plate secured to the fork, a rear flange formed on the plate, a lip extending upwardly and forwardly from the front edge of the plate, a pivoted tongue including a fork fitted over the first mentioned fork, said tongue adapted to swing from a horizontal position to a vertical position, a pivoted latch member pivotally supported between the prongs of the fork of the tongue, said latch member contacting with the upwardly and forwardly extended lip holding the tongue in a vertical position, and horizontal bars carried by the tongue, whereby the tongue may be guided to operate the vehicle.

WILLIAM N. WHEELER.

REFERENCES CITED

The following references are of record in the file of this patent:

UNITED STATES PATENTS

| Number | Name | Date |
|---|---|---|
| 1,562,367 | Sanders | Nov. 17, 1925 |